July 24, 1962  M. M. SEELOFF  3,046,385
FLASH WELDING APPARATUS
Filed Aug. 10, 1959  2 Sheets-Sheet 1
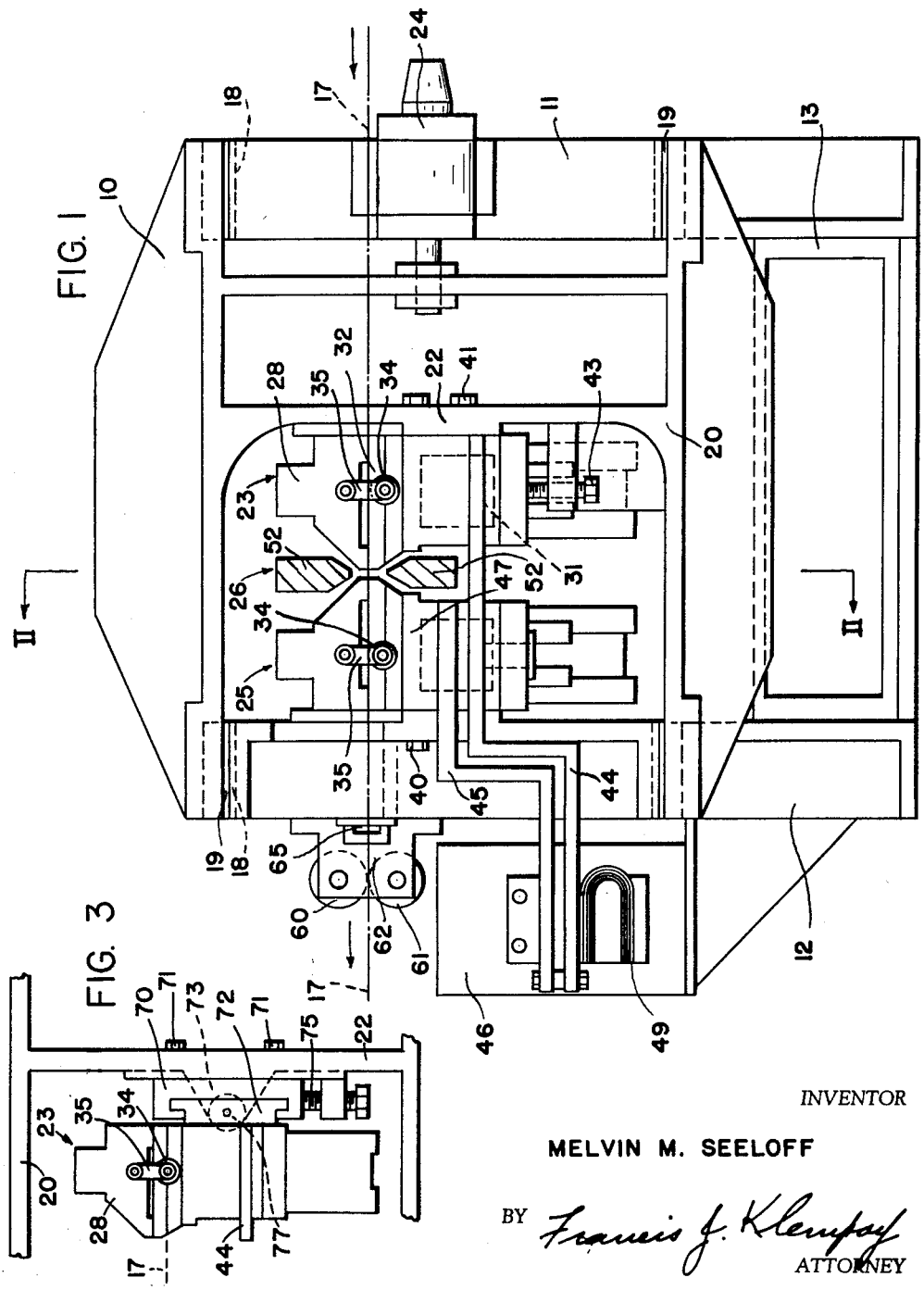
INVENTOR
MELVIN M. SEELOFF
BY *Francis J. Klempay*
ATTORNEY July 24, 1962  M. M. SEELOFF  3,046,385
FLASH WELDING APPARATUS
Filed Aug. 10, 1959  2 Sheets-Sheet 2
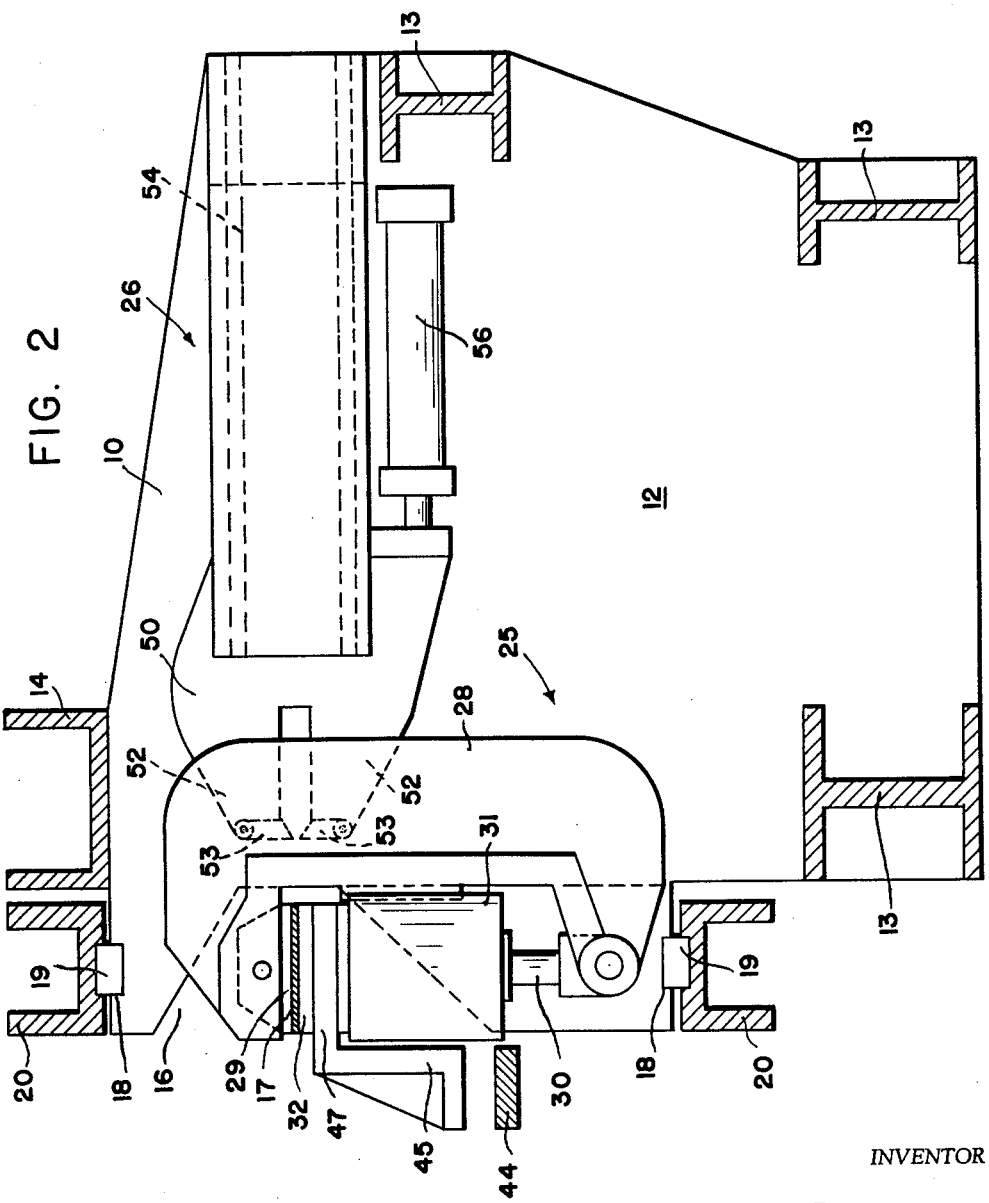
INVENTOR
MELVIN M. SEELOFF
BY Francis J. Klempay
ATTORNEY United States Patent Office 3,046,385
Patented July 24, 1962

3,046,385
FLASH WELDING APPARATUS
Melvin M. Seeloff, Warren, Ohio, assignor to The Taylor-Winfield Corporation, Warren, Ohio, a corporation of Ohio
Filed Aug. 10, 1959, Ser. No. 832,779
15 Claims. (Cl. 219—97)

The present invention relates generally to the welding art and more particularly to improved flash welding apparatus.

It is the primary object of the present invention to provide flash welding apparatus embodying flash trimming means adapted to remove the flash or explusion of the weld at the line of weld. In this manner it is possible to very quickly trim the weld flash immediately following the welding of the workpieces without the necessity of moving the welded workpieces. This allows the flash welding and trimming operations to be completed in a minimum of time and, as will be understood, this is particularly important when flash welding apparatus is employed in a continuous processing line, for example.

Conventional flash welders are so arranged that the trimming means cannot be incorporated in the flash welder but rather the trimming means must be provided at a separate station spaced longitudinally with respect to the line of weld. In accordance with general prior art methods, the workpieces are flash welded and then moved to the flash trimming means where the welding flash is trimmed.

Another object of the present invention is to provide flash welding apparatus of a type having flash trimming means operable at the line of weld which is characterized by its extremely rigid but highly simplified design. In flash welding operations the workpieces to be welded are clamped and moved relatively toward each other at a controlled rate while current is supplied to the workpieces. Arcing or flashing occurs between the adjacent edges of the workpieces to soften the same and they are abutted under considerable force to complete the weld. The success of the flash welding operation is largely dependent upon the ability of the apparatus to very accurately and very precisely control the spacing and the relative movement between the adjacent edges of the workpieces to be welded. The flash welding apparatus of the present invention is of very rigid construction to afford the required precise control of the spacing and the relative movement of the workpieces.

Yet another object of the invention is to provide flash welding apparatus of generally open and uncluttered construction whereby the operator may easily and readily observe the welding operation and whereby sufficient clearance is provided for the flash trimming means. As will be hereinafter more fully apparent, the flash welding apparatus comprises a large open rectangular frame which stationarily supports one of the welding die clamps and the flash trimming means. A large H-shaped slide is very rigidly and accurately slidably mounted on the frame and this slide carries a second or movable welding die clamp. The electrical connections to the welding die clamps from the secondary of a welding transformer are such that maximum clearance is obtained for the passage of the flash trimming means and to allow the operator to observe welding operations.

A still further object of the invention is to provide flash welding apparatus wherein the welding die clamps are so constructed that the appreciable clamping forces exerted upon the workpieces are limited solely to the welding die clamps themselves and are not transferred to the frame, the H-shaped slide or other parts of the flash welding apparatus. In addition, the welding die clamps are of simplified construction and means are provided for adjusting the alignment of the welding die clamps with respect to each other.

A more specific object of the invention is to provide flash welding apparatus which is economical to manufacture while yet having all the desirable characteristics outlined above.

The above, as well as other objects and advantages of the present invention, will become more readily apparent upon consideration of the following specification and accompanying drawing wherein there is disclosed a preferred illustrated embodiment of the invention.

In the drawing:

FIGURE 1 is a side elevational view of flash welding apparatus constructed in accordance with the teachings of the present invention;

FIGURE 2 is an end sectional view taken along the section line II—II of FIGURE 1; and FIGURE 3 is a fragmentary front elevational view showing flash welding apparatus of the present invention embodying means for effecting lateral or cross alignment of the welding die clamps.

Referring now to the drawing, the flash welding apparatus of the present invention comprises a large and generally open rectangular frame 10 which is provided by a pair of longitudinally spaced end members 11 and 12 that are spanned and rigidly tied together by means of transversely extending I-beams 13 and a transversely extending channel shaped structural member 14. The end members 11 and 12, the I-beams 13 and the channel shaped structural member 14 are quite large and provide an extremely rigid and relatively large rectangular frame which is completely open to the front as shown. Each of the end members 11 and 12 has a transversely and forwardly tapering opening 16 in its forward edge to allow the passage of the workpieces longitudinally through the flash welding apparatus. The normal path of workpiece travel is represented by the reference numerial 17 while the direction of workpiece travel is indicated by arrows.

The upper and lower forwardmost edges of the end members 11 and 12 have channel shaped recesses 18 therein which serve as ways for slidably receiving hardened and wear resistant slide blocks 19. The slide blocks 19 are rigidly attached in inwardly facing relation at the ends of the four leg portions of a generally H-shaped slide 20. The H-shaped slide 20 comprises four leg portions mounting the wear resistant slide blocks 19 and a vertically extending body portion 22. An accurately controlled fluid cylinder 24, or other suitable actuating means, is mounted on the forward end member 11 of the frame and has its piston rod drivingly connected with the body portion 22 of the H-shaped slide 20. It will thus be apparent that the H-shaped slide 20, as well as all apparatus carried thereby, is adapted for friction-free longitudinal movement with respect to the path of workpiece travel in a very accurate and precise manner. Also, the interior of the frame is still completely open to accommodate the welding die clamps, the flash trimming means and other component parts of the flash welding apparatus.

Rigidly mounted from the rearward end member 12 of the frame is a stationary welding die clamp 25 and flash trimming means 26 while the body portion 22 of the movable H-shaped slide 20 carries a second or movable welding die clamp 23. The arrangement is such that upon proper energization of the fluid cylinder 24 the welding die clamp 23 is moved in an accurate and precise manner toward the stationary welding die clamp 25 and after the workpieces have been welded the flash trimming means 26 is moved transversely with respect to the path of workpiece travel along the line of weld to trim the weld flash from the welded workpieces.

Considering now the construction of the welding die clamps 23 and 25, reference should be had to FIGURE 2 of the drawing. Each of these welding clamps comprises a generally vertically oriented C-shaped body member 28 extending rearwardly into the frame and opening to the front of the flash welding apparatus. Pivotally mounted from the upper end of each of the frames is an upper clamping platen 29 while the lower end of each C-shaped frame is pivotally connected to the piston rod 30 of a fluid clamping cylinder 31. The housing of the fluid clamping cylinder 31 is insulated from and carries a lower clamping and welding platen or die 32 which is formed from a highly current conductive material. Thus, upon proper actuation of the fluid clamping cylinder 31, the lower clamping and welding platen 32 will be raised into tight clamping relation with respect to a workpiece and the upper clamping platen 29. Such welding die clamp construction is particularly advantageous since all the forces exerted by the fluid clamping cylinder 31 are limited to and contained within the welding die clamp. Thus, the piston rod 30 actuates downwardly against the lower end of the C-shaped body member 28 to apply a clamping force to the upper clamping platen 29 while the housing of the fluid clamping cylinder 31 applies an equal and opposite force to the lower welding and clamping platen 32. As indicated above, both of the welding die clamps 23 and 25 are of similar construction and like reference numerals designate similar component parts in the various views of the drawing.

A lift roller 34 is associated with each of the welding die clamps and is suspended from the upper clamping platen 29 by suitable linkage means 35 whereby when the lower clamping and welding platen 32 is lowered the lift roller 34 supports the workpiece in elevated relation with respect to the lower welding and clamping platen 32. The lift rollers 34 extend transversely with respect to the normal path of strip travel 17 and, of course, the lower clamping and welding platens are suitably recessed or are so disposed to allow relative vertical movement between the lift rollers and the upper clamping and welding platens. The lift rollers 34 support the workpieces and protect the lower clamping and welding platen 32 when these latter members are in their lowered or retracted positions.

The welding die clamp 25 is rigidly attached to the rearward end member 12 by means of bolts 40 while the welding die clamp 23 is attached to the body portion 22 of the H-shaped slide 20 by bolts 41. The welding die clamp 23 is adjustable with respect to the H-shaped slide 20 by means of a jack screw 43. When the bolts 41 are loosened proper manipulation of the jack screw 43 allows the various platens of the two welding die clamps 23 and 25 to be aligned with respect to each other.

As will be understood by those skilled in the art, successful flash welding operations are largely dependent upon the proper positioning of the adjacent strip ends relative to each other. In FIGURE 3 of the drawing the welding die clamp 23 is shown mounted from the H-shaped slide 20 in such a manner that both vertical and lateral adjustments of this welding die clamp are provided whereby it is always insured that the adjacent ends of the strips are properly aligned. In the disclosed apparatus a channel-shaped guide 70 is attached to the body portion 22 of the H-shaped slide 20 by means of bolts 71. The channel-shaped guide 70 slidably receives and supports a T-shaped slide 72 which has rigidly attached to its forward face the welding die clamp 23. A mounting bracket 73 extends longitudinally from the far side of the body portion of the H-shaped slide 20 and mounts a cross aligning fluid cylinder 77. The piston rod of the fluid cylinder 77 is drivingly connected with the T-shaped slide 72 whereby the welding die clamp 23 may be moved transversely with respect to the welding die clamp 25 upon actuation of the cylinder 77. Vertical adjustment of the welding die clamp 23 is provided by means of a jack screw 75 which acts against the bottom surface of the channel-shaped guide 70. The vertical adjustment is made infrequently and prior to welding operations to vertically align the welding die clamps 23 and 25. During welding operations the strips are first clamped and then, if required, the fluid cylinder 77 is properly actuated to cross align the strip ends. The arrangement is such that the adjacent strip ends are very accurately and precisely aligned prior to the flow of welding current as is required in flash welding operations.

The lower clamping and welding platens or dies 32 of the welding die clamps are current conductive and it is, of course, necessary to supply welding current thereto. In the case of the stationary welding die clamp 25 this is accomplished by providing a properly formed current conductor 45 which extends from one secondary terminal of the welding transformer 46 and whose rear end terminates in a transversely extending projection 47 which is clamped between the lower welding and clamping platen 32 and the housing of the fluid clamping cylinder 31. A second current conductor 44 extends to the movable welding die clamp 23 and has a transversely extending portion at one end thereof which is clamped between the lower clamping and welding platen 32 and the housing of the fluid clamping cylinder 31 associated with this welding die clamp. The other end of the conductor 44 is connected to one end of a bundle of thick laminated flexible conductors 49 whose other end terminates at the other secondary terminal of the welding transformer 46. The conductor 44 is thus adapted for limited longitudinal movement whereby current may be continuously supplied to the clamping and welding platen 32 of the movable welding die clamp 23. The conductors 45 and 44 extend along the front of the frame while the welding transformer 46 is positioned at one end of the flash welding apparatus. This arrangement gives maximum operator visibility of the welding operation as well as keeping the rear of the frame open and unobstructed for mounting the flash trimming means.

The flash trimming means 26 comprises a U-shaped trimming carriage 50 defining a pair of transversely extending and vertically spaced arms 52 which mount a vetrically opposed pair of trimming tools 53 at their ends. The trimming carriage 50 is slidably mounted in suitable ways 54 attached to and supported from the rearward end member of the frame 12. For slidably moving the trimming carriage 50 transversely with respect to the normal path of strip travel 17 there is provided a fluid trimming cylinder 55 which is mounted from the rearward end member 12 and has its piston rod drivingly connected with the trimming carriage 50.

Considering now the operation of the apparatus above described, it will be assumed that initially the clamping and welding platens of both welding die clamps 23 and 25 are open whereby a workpiece moving through the welder is supported by the lift rollers 34. It will also be assumed that the movable welding die clamp 23 is retracted to the right as observed when looking at FIGURE 1 of the drawing. When the trailing end of the workpiece is properly positioned the fluid clamping cylinder of the welding die clamp 25 is actuated to clamp the end of this workpiece. A second workpiece is properly positioned in the flash welding apparatus and the leading end thereof is clamped upon actuation of the fluid clamping cylinder 31 associated with the welding die clamp assembly 23.

With the workpieces properly clamped, the fluid cylinder 24 is energized to move the movable welding die clamp 23 forward toward the stationary welding die clamp 25. During the resulting relative movement of the ends of the workpieces current is supplied thereto by the transformer 46, the bundle of flexible conductors 49, conductors 45 and 44, and the lower clamping and welding platens 32 so that arcing or flashing occurs between the adjacent edges of the workpieces. The arcing or flashing softens these edges of the workpieces and upon continued relative movement of the same these edges abut and an upsetting pressure is applied to complete the weld.

After the flow of welding current is terminated, the fluid trimming cylinder 56 is actuated in a manner to move the weld trimming carriage 50 transversely across the normal path of strip travel. During this movement of the trimming carriage 50 the trimming tools 53 trim or skive the weld flash from the weld. As soon as the trimming operation is completed the fluid clamping cylinders 31 are reversely actuated to free the welded workpieces whereby the same may be moved from the flash welding apparatus.

Of course, the flash welding apparatus may comprise ancillary workpiece handling equipment—such as pinch rolls 60 and 61 which are journaled at their ends in brackets 62 attached to the rearward end member 12 of the frame. Also, as will be understood by those skilled in the art, some of the welding flash or expulsion will be forced endwise of the workpieces and it may also be desirable to remove this laterally projecting flash. To accomplish this a pair of trimming knives 65 are mounted on the rearward end member 12 at opposite sides of the normal path of workpiece travel. As the welded workpieces move from the welder the knives 65 engage the sides of the workpieces and trim the laterally projecting weld flash therefrom.

It should thus be apparent that the objects initially set forth have been accomplished by the provision of flash welding apparatus embodying trimming means operable at the line of weld which is characterized by its extreme rigidity, compactness, simplicity and low cost of manufacture. However, it should be understood that many changes may be made in the illustrated embodiment of the invention without departing from the clear teachings thereof. Accordingly, reference should be had to the following appended claims in determining the true scope and intent of the invention.

I claim:

1. Flash welding apparatus for joining the adjacent ends of workpieces which comprises a frame, said frame comprising a pair of longitudinally spaced end members, a plurality of transversely extending structural members spanning and tying together said end members, said frame being open and generally rectangular, a generally H-shaped slide, said H-shaped slide having four end portions and a vertically extending body portion, each of said end portions being slidably mounted with respect said end members of said frame, the arrangement being such that said H-shaped slide is slidably supported at said end portions thereof, actuating means mounted on one of said end members and being drivingly connected with said H-shaped slide for moving the same, a first welding die clamp stationarily mounted on one of said end members, and a second movable welding die clamp mounted on said body portion of said H-shaped slide.

2. Apparatus according to claim 1 further characterized in that each of said welding die clamps comprises a C-shaped body member, a clamping platen attached to one end of said C-shaped body member, a fluid clamping cylinder mounted on the other end of said C-shaped body member, and a second clamping platen being carried by said fluid clamping cylinder whereby the clamping forces of said welding die clamp are limited thereto.

3. Apparatus according to claim 1 further comprising means to supply welding current to said welding die clamps, said means to supply comprising a welding transformer having a pair of secondary terminals mounted longitudinally outward of said frame, first conductor means interconnecting one secondary terminal of said welding transformer with said first welding die clamp, second conductor means connecting the other of said secondary terminals of said welding transformer with said second welding die clamp, said first of said second conductor means extending longitudinally in generally parallel relation for a portion of their lengths, and said first and said second conductor means being disposed laterally outward of said frame for at least a portion of their lengths.

4. Apparatus according to claim 3 further characterized in that said second conductor means comprises a bundle of laminated flexible conductors, and each of said conductor means have a laterally extending projection which is electrically connected to its associated welding die clamp.

5. Flash welding apparatus for joining the adjacent ends of workpieces which comprises a stationary generally open and large rectangular frame, a generally H-shaped slide, said H-shaped slide having four end portions and a vertically extending body portion, each of said end portions being slidably mounted on and guided for longitudinal movement with respect to said frame, actuating means mounted on said frame and being drivingly connected with said body portion for moving said H-shaped slide, a first welding die clamp stationarily mounted on said frame, and a second welding die clamp mounted on said body portion of said H-shaped slide.

6. Flash welding apparatus for joining the adjacent ends of workpieces which comprises a frame, said frame being open and generally rectangular, a generally H-shaped slide, means slidably mounting and guiding said H-shaped slide for longitudinal movement with respect to said frame, actuating means for moving said H-shaped slide, a first welding die clamp mounted on said frame, and a second welding die clamp mounted on said H-shaped slide.

7. Flash welding apparatus for joining the adjacent ends of workpieces which comprises a frame, said frame being open and generally rectangular, a slide, means mounting said slide for longitudinal movement from said frame, actuating means for moving said slide on said frame, a first welding die clamp mounted on said frame, a second welding die clamp mounted on said slide, a welding transformer having a pair of secondary terminals, first conductor means interconnecting one of said secondary terminals with said first welding die clamp, second conductor means interconnecting the other of said secondary terminals with said second welding die clamp, and said first and said second conductor means being laterally offset from said welding die clamps during at least a portion of their lengths.

8. Apparatus according to claim 7 further characterized in that said first and said second current conductor means extend in parallel relation for at least a portion of their lengths, and said second current conductor means comprising flexible laminated conductors.

9. Apparatus according to claim 7 further characterized in that each of said current conductor means has a laterally extending projection, and said laterally extending projection being electrically connected to said welding die clamp associated therewith.

10. Flash welding apparatus for joining the adjacent ends of workpieces which comprises a pair of relatively longitudinally movable welding die clamps, each of said welding die clamps comprising a C-shaped body member, a clamping platen attached to one end of said C-shaped body member, actuating means mounted on the other end of said C-shaped body member, a second clamping platen carried by said actuating means whereby the clamping forces of each of said welding die clamps are limited thereto, and means to supply welding current to said welding die clamps.

11. Apparatus according to claim 10 further characterized in that each of said welding die clamps further comprises a lift roller, linkage means connecting said lift roller with the first of said clamping platens, and said lift roller being adapted to support a workpiece in spaced relation with said second clamping platen when said clamping platens are separated.

12. Apparatus according to claim 10 further characterized in that said means to supply welding current to said welding die clamps comprises a pair of conductors, said conductors extending longitudinally and in laterally offset relation with respect to said welding die clamps, said conductors having laterally extending projections, and said laterally extending projections being clamped between said actuating means and said second clamping platens.

13. Flash welding apparatus for joining the adjacent ends of workpieces which comprises a pair of relatively longitudinally movable welding die clamps, means to supply electrical energy to said welding die clamps, means to relatively move said welding die clamps transversely with respect to each other for cross aligning said adjacent ends of said workpieces after the same are clamped, said means to relatively move comprising a structural member, a transversely extending guide mounted on said structural member, a slide slidably received in said guide, said slide mounting one of said welding die clamps, and power means for moving said slide in said guide for effecting said cross alignment.

14. Flash welding apparatus for joining the adjacent ends of workpieces which comprises a stationary generally open and large rectangular frame, a slide mounted for movement on said frame, a first welding die clamp mounted on said frame, a second welding die clamp mounted on said slide, actuating means for moving said slide and said second welding die clamp mounted thereon toward and away from said first welding die clamp, means supplying electrical energy to said first and said second welding die clamps, said means supplying comprising a pair of conductor means, said conductor means being laterally offset to one side of said first and said second welding die clamps outwardly of said frame to define an open area in said frame disposed between said welding die clamps, a weld trimming carriage slidably mounted from said frame in said open area, said trimming carriage carrying a pair of cooperating trimming tools, and means to move said trimming carriage transversely with respect to the direction of movement of said workpieces and said second welding die clamp from a position laterally offset to the other side of said welding die clamps across the line of weld to trim the welding flash from the welded workpieces while the same are still clamped by said welding die clamps.

15. Apparatus according to claim 14 further characterized in that said slide is generally H-shaped, said slide having four end portions and a body portion, said second welding die clamp being mounted on said body portion of said H-shaped slide, and each of said four end portions being slidably guided on said frame.

References Cited in the file of this patent
UNITED STATES PATENTS

| | | |
|---|---|---|
| 2,297,893 | Jones | Oct. 6, 1942 |
| 2,314,656 | Morton | Mar. 23, 1943 |
| 2,716,177 | Cumming | Aug. 23, 1955 |